UNITED STATES PATENT OFFICE.

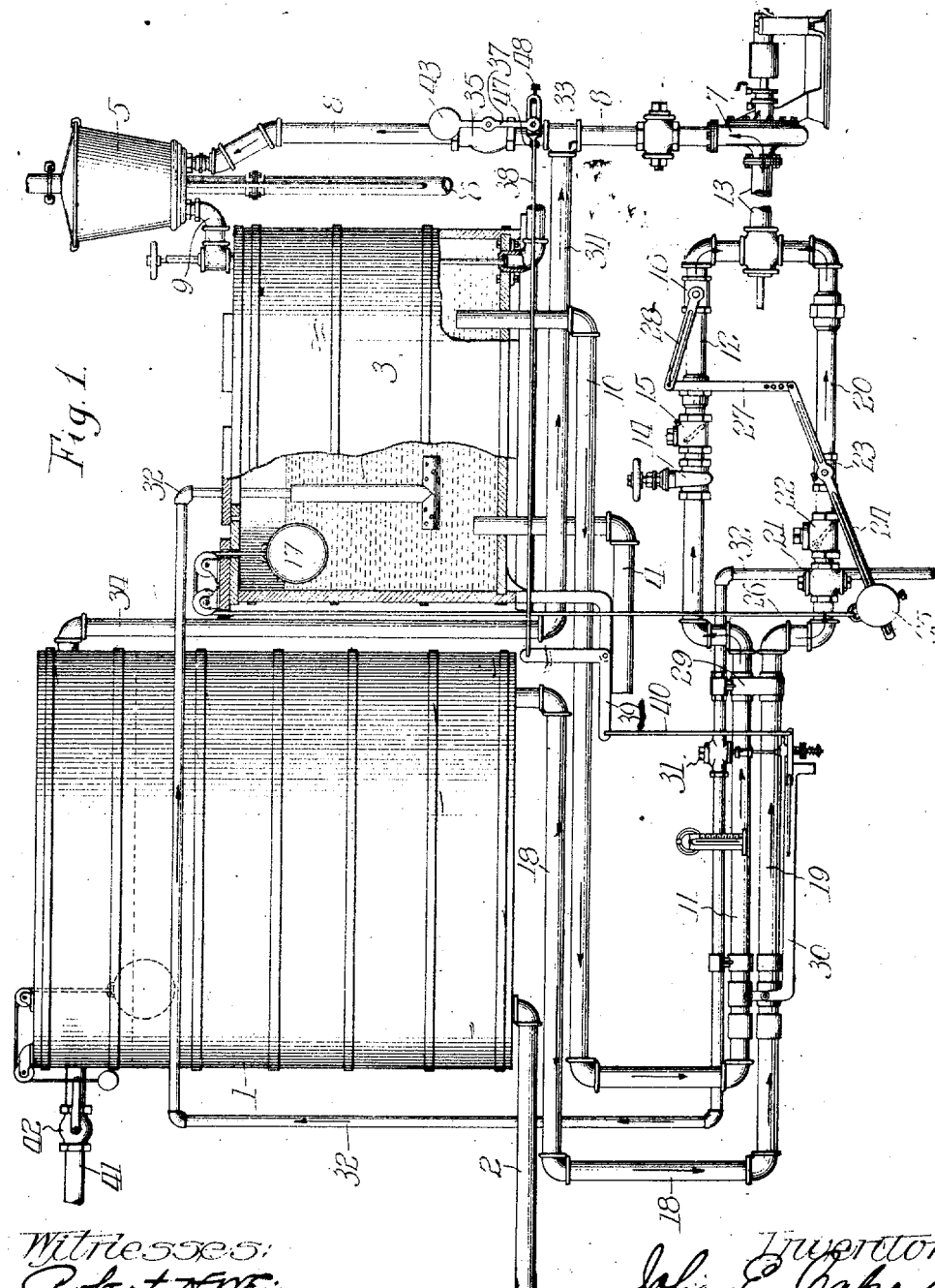

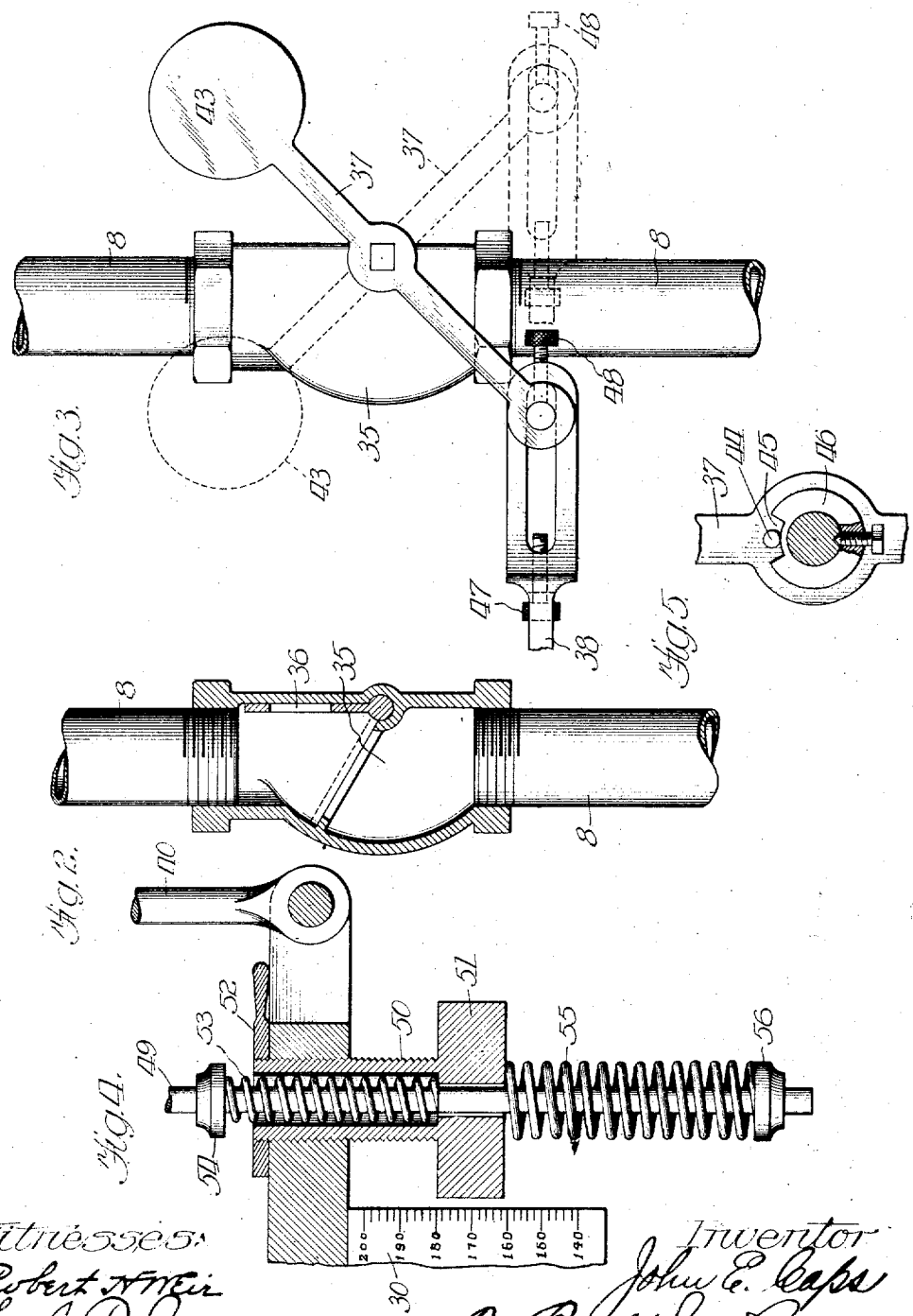

JOHN E. CAPS, OF WILMETTE, ILLINOIS.

APPARATUS FOR HEATING WATER.

1,018,408.

Specification of Letters Patent.

Patented Feb. 27, 1912.

Application filed December 13, 1910. Serial No. 597,161.

*To all whom it may concern:*

Be it known that I, JOHN E. CAPS, citizen of the United States, residing at Wilmette, in the county of Cook and State of Illinois, have invented certain new and useful Improvements in Water-Heating Apparatus; and I do hereby declare the following to be a full, clear, and exact description of the invention, such as will enable others skilled in the art to which it appertains to make and use the same.

This invention relates to improvements in water heating apparatus and has for its object to provide means for automatically controlling the temperature of the water.

The invention consists in the features of construction and combinations of parts hereinafter fully described and claimed.

In the accompanying drawings illustrating this invention: Figure —1— is a view partly in elevation and partly in section showing water heating apparatus constructed in accordance with my invention. Fig. —2— is a detail sectional view showing one of the valves employed. Fig. —3— is a detail view in elevation showing the means actuating the valve shown in Fig. —2—. Fig. —4— is a fragmentary detail sectional view of one end of a thermostatically actuated lever showing the connection thereof with the stem of a valve. Fig. —5— is a fragmentary detail view showing connection between a valve stem and a lever for actuating the valve.

The invention relates particularly to water heating apparatus in which the main heating medium employed is waste exhaust steam.

The present invention relates more particularly to improvements upon the apparatus shown and described in the Letters Patent to C. A. Cartwright, No. 918961 and in my application for Letters Patent Serial No. 571,491 filed July 11, 1910.

In the last-named application there is shown and described a thermostat controlling the supply of live steam to the hot water reservoir, and in addition thereto a single float actuating valves controlling the supply of water from a main to said reservoir and the return to the latter of water drawn therefrom. The said float serves to maintain a constant water level in the reservoir and said thermostat to maintain a given minimum temperature therein.

My present invention has for its object, first, to provide means whereby the temperature of the water in the hot water reservoir is maintained at a substantially uniform minimum temperature. Second, to provide means whereby the water in the hot water reservoir is prevented from exceeding a given maximum temperature. Third, to provide means whereby surplus heat units are absorbed by a secondary water supply to avoid waste.

The several objects of the invention are attained by means of the apparatus shown and which I will now proceed to describe.

The apparatus comprises the reservoir 1 which is fed from a street main or other source of supply admitted through the pipe 41 controlled by the float-controlled valve 42. This water is preferably treated to soften the same and constitutes the cold water supply to service pipe 2 leading to points of consumption such as washing machines, dye or bleaching vats, etc. Adjacent said reservoir 1 is a hot water reservoir 3 the latter being of less height than said reservoir 1 for reasons which will hereinafter appear. The hot water reservoir 3 receives its supply of water from the reservoir 1 and delivers it through the service pipe 4 to points of consumption such as above mentioned. Adjacent the tank 3 is an exhaust steam hood 5 fed from the exhaust pipe 6 of a steam power plant, the steam passing into the said hood being condensed by direct contact with water fed to said hood from the pump 7 through the pipe 8, said water absorbing the heat units of the steam and being delivered through the pipe 9 into said reservoir 3. The latter is connected with the suction end of the pump 7 by means of pipe 10 connecting with pipe 11 constituting a member of the thermostat, and pipes 12 and 13. In the pipe 12 there is interposed a manually operated valve 14, a check valve 15, and a valve 16 connected, as hereinafter described, with the float 17 in the reservoir 3. By means of these connections the water contained in the reservoir 3 is repeatedly passed through the hood 5 as will be obvious.

The reservoir 1 is also connected with the suction end of the pump 7 by means of pipe 18 connecting with pipe 19, constituting a member of the thermostat, which in turn connects with pipe 20 and pipe 13. In the pipe 20 are interposed a manually operated valve 21, a check valve 22 and a valve or cock 23, the stem of the latter being connected with the lever 24 between the ends thereof, said lever carrying a weight 25 at one end and being suitably connected at said end with the float 17 by means of the cable 26. Said lever 24 is connected at its other end by means of the link 27 with the lever 28 on the stem of the valve 16, said valves 16 and 23 being thus simultaneously actuated in accordance with variations in water lever in the reservoir 3. The valve 23 is closed by attainment of the high water level in the reservoir 3 and is opened as the said level is lowered, the valve 16 being closed as the valve 23 is opened, the degree of opening and closure of the respective valves depending upon the degree of variation in the water level in said reservoir 3. The said pipes 11 and 19 are coupled by means of a member 29 relatively to which the other end portions of said pipes move during expansion and contraction thereof. An L-shaped lever 30 is pivotally connected at the free end of its short arm with the pipe 11 and between the ends of said short arm with the pipe 19, the long arm of said lever being adapted to be swung through a relatively long arc by a relatively limited movement of the pivotal connections of the short arm relatively to each other due to expansion and contraction of said pipe 11. The free end of said lever 30 is connected with the stem of a valve 31 interposed in a pipe 32 connected at one end with a source of supply of live steam and at its other end delivering into the reservoir 3, the said valve being adapted to be opened when the pipe 11 contracts due to the passage therethrough of water of a lower temperature than that intended to be maintained in said reservoir 3.

The pipe 8 is connected between its ends by means of a T coupling 33 with a pipe 34 delivering into the reservoir 1 adjacent the upper end thereof, the delivery end of said pipe 34 being preferably disposed at a higher elevation than the discharge end of said pipe 8 so as to resist delivery into said reservoir 1 by gravity. This constitutes the simplest means for resisting such delivery although mechanical means for accomplishing the same purpose may obviously be substituted if desired. In the latter there is also interposed above said T coupling 33 a valve 35 of the so-called fly type. This valve is shown in detail in Figs. —2— and —3— in which it will be seen that the valve proper therein is provided with an opening 36 for the passage of a limited quantity of water when said valve is closed. On the stem of said valve 35 there is mounted a lever 37 which is connected at one end by means of the link 38 with the free end of one arm of a bell crank lever 39, the latter being suitably pivotally supported at its elbow and connected at the free end of its other arm with the free end portion of said lever 30 by means of a link 40. On the other end of the lever 37 is a weight 43 which as said valve 35 is opened and closed respectively passes to opposite sides of the vertical plane of the axis of oscillation of said valve and said lever. The connection between said lever 37 and said link 38 is made by providing a longitudinal slot in the latter in which a crank-pin on the first-named end of said lever 37 engages so that as said lever 37 passes the vertical plane of its axis of rotation in either direction it will be free to fall and thus impart sudden opening or closing movement to said valve, either through the entire arc of movement of said valve or during its final movement in either direction. By rendering the lever 37 rigid with the stem of the valve 35, as shown in Fig. —4—, the primary opening or closing movement of the valve will be in accordance with the rapidity of movement of the lever 30 or relatively gradual, while the final opening or closing movement thereof would be sudden. If, however, as shown in Fig. —5— the lever 37 is rotatably mounted on the valve stem and is equipped with a pin or projection 44 engaging either end wall of the segmental recess 45 in a collar 46 rigidly mounted on the valve-stem, the valve will be moved solely in either direction by the dropping of the weight 43 and thus its entire movement in either direction rendered sudden.

By means of set screws 47 and 48 projecting into the ends of the slot in the end of the link 38, the latter is practically shortened or lengthened at will thus enabling the opening and closure of said valve 35 with relation to movements of the lever 30 to be regulated at will, this being important in controlling the maximum temperature of the water in the reservoir 3 as will hereinafter appear.

The connection of the lever 30 with the stem 49 of the valve 31 is shown in detail in Fig. —4—, said stem passing through a sleeve 50 having threaded engagement with a threaded opening in said lever, said sleeve being turned by means of the head 51 thereof and being locked against rotation by means of the head 51 thereof and being locked against rotation by means of a lock nut 52. The opening in the sleeve 50 is annularly enlarged at one end to receive one end portion of a compression spring 53 bearing at its projecting end upon a collar 54 on said valve-stem 49. A similar compression spring 55 is interposed between the other end of the sleeve 50 and a collar 56 on said valve-stem 49. Thus the movements of the lever 30 in either direction are transmitted to the valve-stem through said springs 53 and 55, the lever being capable of continuing its movement in either direction beyond the limits of movement of said valve-stem.

On the lever 30 is a projection 57 on one edge portion of which is a graduated scale 58 relatively to which the sleeve 50 is adjusted to determine the normal minimum temperature to be maintained in the reservoir 3, said graduations being suitably numbered to indicate different temperatures. If the temperature of the water passing through the pipe 11 is less than the temperature indicated opposite the upper face of the head 51 of said sleeve 50 a movement of the lever 30 in a direction to open the valve 31 will occur.

The operation of my said apparatus is as follows: Assuming that the reservoir 3 has just been filled with cold water and that the reservoir 1 is also full of the same. Exhaust steam is passed up through the pipe 6 into the hood 5 and the pump 7 is delivering water into the latter. As the water level in the reservoir 3 is at the normal point the valve 16 will be open and the valve 23 closed. The cold water entering the suction end of the pump 7 passes through the pipe 11 from said reservoir 3 and said pipe is therefore contracted so that the valve 31 is open and admitting live steam to said reservoir 3 to heat the water therein. At the same time the water delivered from the pump 7 into the hood 5 is brought into intimate contact with the exhaust steam thereby condensing the latter and absorbing its heat units. The water is maintained in constant circulation from the reservoir 3 through the pipes 11, 12 and 13 and through the pump 7 and pipe 8 and exhaust hood 5 back to the reservoir. The water is thus relatively rapidly heated, the rapidity of attainment of a high temperature being, of course, dependent to a large extent upon the volume of exhaust steam passing into the hood and also upon the extent of consumption of water from said reservoir while the latter is being heated. Assuming, however, that there is no consumption and that it is desired to maintain the temperature of water in said reservoir at 180 degrees Fahr. the position of the valve-stem 49 of valve 31 relatively to the lever 30 will be accordingly adjusted by turning the head 51 of the sleeve 50 so that as soon as the water passing through the pipe 11 has attained the said temperature said valve will be closed. As water from said reservoir 3 will, after the same has attained the desired temperature, be more or less constantly withdrawn at the various points of consumption thereof it is desirable to permit said water to attain a higher temperature than 180 degrees Fahr. so as to prevent the consumption of live steam to as great an extent as possible. As the water at said temperature of 180 degrees continues to pass through the hood 5 and into contact with the exhaust steam of higher temperature it will become gradually hotter. It is desired, however, to prevent the waste of exhaust steam to prevent the attainment by the water of a temperature so high as to render it ineffectual as a steam condensing agent. We will assume that the maximum temperature desired to be attained is 200 degrees Fahr. This is controlled by the valve 35 and the set-screw 47, it being necessary that said valve 35 be closed as soon as the temperature of the water passing through the pipe 11 attains said temperature. The farther said set-screw 47 projects into said slot the less the upward movement of the free end of said lever 30 necessary to throw the lever 37 into position to cause a closure of said valve 35. In the same way the set-screw 48 controls the time of reopening of the valve 35, as will be obvious.

As soon as the valve 35 is closed only a small portion of the water delivered from the pump 7 will be enabled to pass into the hood 5, the remainder thereof being deflected through the pipe 34 into the reservoir 1, the resistance of the valve 35 to the passage of water serving to overcome the difference in elevation between the delivery end of the pipe 8 and the delivery end of the pipe 34 to deliver through the latter. As the discharge into the reservoir 3 decreases by reason of the closure of the valve 35 and the suction from said reservoir 3 remains the same, the water level in said reservoir 3 will obviously become lowered thus partially or entirely closing the valve 16 and to a similar extent opening the valve 23, whereby the suction from the reservoir 3 is decreased or entirely shut off and suction from the reservoir 1 takes place. The water from reservoir 1 being relatively cold will now pass through the slot in the valve 35, being delivered into the reservoir 3 after passing through the hood and, of course, absorbing heat units from the exhaust steam, the major portion of said water being obviously returned to the reservoir 1. The injection of cold water into the reservoir 3 thus effected will obviously decrease the temperature of the water contained in the latter and as soon as the same falls considerably below said maximum temperature of 200 degrees Fahr. the lever 30 will move downwardly at its free end thereby opening said valve 35 through the engagement of the set-screw 48 with the crank pin of the lever 37 and admitting a large quantity of colder water thus ultimately restoring the normal water level in said reservoir 3 and entirely opening said valve 16 and closing the valve 23 whereupon suction from the reservoir 3 takes place to the exclusion of any supply thereto from the reservoir 1.

It will be apparent that the opening and closure of the valves 16 and 23 is very slow and gradual. The hot water drawn from the reservoir 3 and consumed must obviously be also replaced regardless of temperature, this being effected by means of the float 17 and valves 16 and 23.

From the above it will be seen that the thermostat performs the double function of regulating the minimum as well as the maximum temperature of the water contained in the reservoir 3. The reservoir 1 acts primarily as a source of supply of softened water to the reservoir 3 and as an absorber of surplus heat units incapable of absorption by the water in the reservoir 3 without inducing waste of exhaust steam.

The apparatus is designed to utilize exhaust steam as a heating medium exclusively, the live steam supply being used only in the event of excessive consumption of hot water.

By passing the water from the reservoir 3 continuously through the hood 5 and back to the reservoir, stratification in the latter is prevented and a temperature varying between the fixed minimum and maximum is very accurately maintained, the capacity of the reservoir 3 being regulated by the needs of the plant, it being found that where the capacity need is greater, the power plant is proportionately larger and the waste of exhaust steam is likewise proportionately greater.

I desire to direct particular attention to the fact that an interchange of waters from the hot to the cold water reservoir and vice versa takes place only after the attainment of the predetermined maximum temperature in the reservoir 3 and that such interchange is entirely controlled by the valve 35. Such interchange takes place only temporarily, that is, until the water level in the reservoir 3 has fallen sufficiently to cause complete closure of the valve 16, after which water is delivered only from reservoir 1 to reservoir 3, part of said water being returned to the reservoir 1 until the valve 35 is again opened.

I claim as my invention:—

1. In apparatus of the kind specified, the combination with a hot water reservoir, a constantly active heater, a pump for passing water from said reservoir continuously into heat absorbing relation to said heater and back to said reservoir, a reservoir for cold water, connection between the same and the suction end of said pump for passing water therefrom into said hot water reservoir through said heater, valves controlling the connections between said respective reservoirs and said suction end of said pump, a float in said hot water reservoir actuating both said valves and adapted to open one thereof as the other closes, a pipe leading from the discharge pipe from said pump to said cold water reservoir, and means for normally resisting the delivery of water therethrough, of thermostatically controlled means interposed in said delivery pipe from said pump for deflecting flow therefrom into said cold water reservoir against the resistance of said flow.

2. In apparatus of the kind specified, a hot water and a cold water reservoir, a constantly active heater communicating at its delivery end with said hot water reservoir, a pump connected at its delivery end with said heater, a pipe establishing communication between said delivery end of said pump and said cold water reservoir, means for normally resisting flow through said pipe, normally open connection between the suction end of said pump and said hot water reservoir, normally closed connection between the suction end of said pump and said cold water reservoir, a float in said hot water reservoir controlling both said connections and adapted to open the latter as the former is closed, and a thermostatically controlled valve in the delivery pipe from said pump adapted when closed to cause a flow into said cold water reservoir against the resistance offered thereto, there being a by-pass opening in said valve through which a part of the water is delivered by the pump into said heater.

3. In apparatus of the kind specified, a hot water and a cold water reservoir, a constantly active heater communicating at its delivery end with said hot water reservoir, a pump connected at its delivery end with said heater, a pipe establishing communication between said delivery end of said pump and said cold water reservoir, means for normally resisting flow through said pipe, normally open connection between the suction end of said pump and said hot water reservoir, normally closed connection between the suction end of said pump and said cold water reservoir, a float in said hot water reservoir controlling both said connections and adapted to open the latter as the former is closed, a normally inactive heater disposed in said hot water reservoir, a valve controlling the same, a valve in the delivery pipe from said pump adapted when closed to cause a flow into said cold water tank against the resistance thereto, and a thermostatically operated lever operatively connected with both said valves.

4. In apparatus of the kind specified, a hot water and a cold water reservoir, a constantly active heater communicating at its delivery end with said hot water reservoir, a pump connected at its delivery end with said heater, a pipe establishing communication between said delivery end of said pump and said cold water reservoir, means for normally resisting flow through said pipe, normally open connection between the suction end of said pump and said hot water reservoir, normally closed connection between the suction end of said pump and said cold water reservoir, a float in said hot water reservoir controlling both said connections and adapted to open the latter as the former is closed, a normally inactive heater disposed in said hot water reservoir, a valve controlling the same, a valve in the delivery pipe from said pump adapted when closed to cause a flow into said cold water tank against the resistance thereto, there being a by-pass opening in said valve through which a part of the water is delivered by the pump into said heater, and a thermostatically operated lever operatively connected with both said valves.

5. In apparatus of the kind specified, a hot water reservoir, a normally inactive water heater, a cold water reservoir normally closed, means establishing feed connection from the same to said hot water reservoir, normally inactive means for delivering hot water into said cold water reservoir, a valve controlling said last-named means, a valve controlling the activity of said heater, a thermostatically actuated lever operatively connected with said last-named valve and adapted to open the same when the water in said hot water reservoir falls below a given temperature, and operative connection between said lever and said first-named valve for actuating the latter to cause a flow of hot water into said cold water reservoir when the temperature of the water in said hot water reservoir rises above a given temperature, and means actuated by variations in water level in said hot water reservoir for causing a flow of water from said cold water reservoir thereto.

6. In apparatus of the kind specified, a source of heat, a hot water reservoir, means for continuously passing water from said reservoir to said source of heat and back to said reservoir, a cold water reservoir, means establishing a feed connection from the cold water to the hot water reservoir, means establishing connection from the hot water to the cold water reservoir, a thermostatically actuated diversion valve, controlling the last-named connection, and means actuated by variations in water level in said hot water reservoir controlling the first-named connection.

7. In apparatus of the kind specified, a source of heat, a hot water reservoir, means for continuously passing water from said reservoir to said source of heat and back to said reservoir, a cold water reservoir, means establishing a feed connection from the cold water to the hot water reservoir, means establishing connection from the hot water to the cold water reservoir, a thermostatically actuated diversion valve interposed in the pipe leading from said hot water reservoir to said source of heat and adapted to divert the flow into said cold water reservoir when the hot water attains a predetermined temperature, and means actuated by variations in water level in said hot water reservoir controlling the first-named connection.

8. In apparatus of the kind specified, a hot water reservoir, a cold water reservoir, means establishing feed connection from the latter to the former, means actuated by variations in water level in said hot water reservoir, controlling said connection, means establishing connection from the hot water to the cold water reservoir, a valve controlling said connection, and a lever actuated by variations in temperature of the water in said hot water reservoir controlling said valve.

9. In apparatus of the kind specified, a hot water reservoir, a cold water reservoir, means establishing connection from each thereof to the other for effecting an interchange of water, a thermostatically actuated valve controlling the flow of hot water to said cold water reservoir, and means actuated by decrease of water level in said hot water reservoir due to the flow therefrom into said cold water reservoir for establishing feed connection from said cold water to said hot water reservoir to reëstablish the normal water level therein, whereby reduction of the temperature of the hot water is effected.

10. In apparatus of the kind specified, a hot water reservoir, a cold water reservoir, a constantly active heater delivering into said hot water reservoir, a normally inactive heater in the latter, connection respectively from each of said reservoirs to said constantly active heater, a single pump interposed in said connections, a by-pass connection from the delivery end of said pump to said cold water reservoir, a valve controlling said connection, a valve controlling said normally inactive heater, a thermostatically actuated lever having operative connection with each of said valves, said lever controlled by variations in temperature of the hot water and adapted when said temperature falls to open said last-named valve and when said temperature rises to close both said valves at respectively different intervals, the valve controlling said by-pass connection when closed causing flow from said hot water to said cold water reservoir whereby the water level in the former is reduced, a float in said hot water reservoir, a valve controlled thereby and controlling the flow from the cold water to the hot water reservoir and adapted to be opened by said decrease in water level, and a by-pass connection between the delivery end of said pump and said heater for feeding the latter during the interval of flow of hot water to said cold water reservoir, substantially as and for the purpose specified.

11. In apparatus of the kind specified, a hot water reservoir, a constantly active heater delivering thereto, a return connection from said reservoir to said heater, a pump interposed in said connection serving to maintain the water of said reservoir in constant circulation through said heater, a valve interposed in said connection, a cold water supply connected with the suction end of said pump, a valve interposed in said connection, a float in said reservoir actuating both said valves, the last-named valve being normally closed and the first-named normally open and adapted to be closed as the other opens, means for maintaining parallel parts of said respective connections rigid with each other at one point, a lever pivotally secured to each of said parallel parts and adapted to be swung by expansion and contraction of the hot water connection relatively to the cold water connection due to variations in temperature in the water of said reservoir, a valve interposed in the delivery pipe from said pump, a by-pass hot water discharge connection from said delivery pipe controlled by said valve, and connection between said valve and said lever to close said valve when the water in the reservoir attains a predetermined maximum temperature, whereby hot water is discharged and the water level in the reservoir reduced, thereby opening the cold water connection to said pump, there being an opening in said valve for the passage of part of the water delivered by said pump through said heater into said reservoir, substantially as and for the purpose specified.

12. In apparatus of the kind specified, a hot water reservoir, a constantly active heater delivering thereto, a return connection from said reservoir to said heater, a pump interposed in said connection serving to maintain the water of said reservoir in constant circulation through said heater, a valve interposed in said connection, a cold water supply connected with the suction end of said pump, a valve interposed in said connection, a float in said reservoir actuating both said valves, the last-named valve being normally closed and the first-named normally open and adapted to be closed as the other opens, means for maintaining parallel parts of said respective connections rigid with each other at one point, a lever pivotally secured to each of said parallel parts and adapted to be swung by expansion and contraction of the hot water connection relatively to the cold water connection due to variations in temperature in the water of said reservoir, a valve interposed in the delivery pipe from said pump, a by-pass hot water discharge connection from said delivery pipe controlled by said valve, and connection between said valve and said lever to close said valve when the water in the reservoir attains a predetermined maximum temperature, and means for adjusting the time of closure of said valve relatively to the arc of movement of said lever whereby the maximum temperature attainable by the hot water may be varied, said valve, when closed, causing a discharge of hot water through said by-pass and reducing the water level in the reservoir, thereby opening the cold water connection to said pump, there being an opening in said valve for the passage of part of the water delivered by said pump through said heater into said reservoir, substantially as and for the purpose specified.

13. In apparatus of the kind specified, means for fixing the maximum temperature attainable by the water comprising a constantly active heater delivering into the hot water reservoir, a pump delivering into said heater, connection between the suction end of said pump and said reservoir, a normally open valve in said connection, connection between the suction end of said pump and a cold water supply, a normally closed valve in said connection, a float in said reservoir adapted to simultaneously actuate said valves in respectively reverse direction when the water level in said reservoir falls, a normally inactive discharge connection from the delivery end of said pump for withdrawing water, a valve controlling the same, and means actuated by variations in temperature in the water of said reservoir controlling said valve, the latter when actuated in one direction causing a partial discharge through said discharge connection whereby the water level in said reservoir is reduced and the cold water supply connection opened, part of the water delivered by said pump passing into the reservoir through the said heater until the temperature of the reservoir water has receded to a given point, whereby the last-named valve is returned to its normal position.

14. In apparatus of the kind specified, a constantly active heater, a hot water reservoir, a pump for continuously passing water therefrom through said heater to increase the temperature thereof, a cold water reservoir, normally closed connection between said cold water reservoir and the delivery end of said pump, and a thermostatically controlled valve interposed in said connection and adapted to effect an interchange of the waters of said reservoirs to prevent the attainment of more than a predetermined maximum temperature of the water in said hot water reservoir.

15. In apparatus of the kind specified, a constantly active heater, a hot water reservoir, means for continuously passing water therefrom through said heater to increase the temperature thereof, a cold water reservoir, means for effecting an interchange of the waters of said reservoirs, a valve controlling said means, a thermostatically actuated member operatively connected with and controlling said valve, and means interposed in said connection for varying the periods of operation of said valve relatively to the movement of said member, whereby the temperature attainable by the hot water before effecting said interchange of waters is controlled.

16. In apparatus of the kind specified, a hot-water reservoir, a normally inactive heater for the contents thereof, a valve controlling the same, a constantly active heater for the water in said reservoir, a cold water supply, a float valve controlling the same, a by-pass discharge, a valve controlling same, and a single thermostatically actuated member controlling said first-named and said last-named valves and adapted to actuate the same at different intervals, substantially as and for the purpose described.

In testimony whereof I have signed my name in presence of two subscribing witnesses.

JOHN E. CAPS.

Witnesses:
  M. M. BOYLE,
  H. L. HALE.